(12) United States Patent
Borel et al.

(10) Patent No.: US 11,134,202 B2
(45) Date of Patent: Sep. 28, 2021

(54) PLENOPTIC CAMERA COMPRISING A SPATIAL LIGHT MODULATOR

(71) Applicant: INTERDIGITAL CE PATENT HOLDINGS, Paris (FR)

(72) Inventors: Thierry Borel, Rennes (FR); Valter Drazic, Betton (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 15/514,203

(22) PCT Filed: Sep. 21, 2015

(86) PCT No.: PCT/EP2015/071616
§ 371 (c)(1),
(2) Date: Mar. 24, 2017

(87) PCT Pub. No.: WO2016/046136
PCT Pub. Date: Mar. 31, 2016

(65) Prior Publication Data
US 2017/0302839 A1 Oct. 19, 2017

(30) Foreign Application Priority Data
Sep. 25, 2014 (EP) .................................. 14306481

(51) Int. Cl.
*H04N 5/225* (2006.01)
*H04N 5/235* (2006.01)
*G02F 1/137* (2006.01)

(52) U.S. Cl.
CPC ....... *H04N 5/2352* (2013.01); *H04N 5/22541* (2018.08); *G02F 1/137* (2013.01)

(58) Field of Classification Search
CPC ... H04N 5/2352; H04N 5/22541; G02F 1/137
USPC .................................................. 348/362, 363
See application file for complete search history.

(56) References Cited

U.S. PATENT DOCUMENTS

| | | | |
|---|---|---|---|
| 4,944,578 | A | 7/1990 | Denison |
| 7,965,936 | B2 | 6/2011 | Raskar |
| 8,345,144 | B1 | 1/2013 | Georgiev et al. |
| 8,471,920 | B2 | 6/2013 | Georgiev et al. |
| 8,570,634 | B2 | 10/2013 | Luebke et al. |

(Continued)

FOREIGN PATENT DOCUMENTS

| | | |
|---|---|---|
| CN | 102026011 | 4/2011 |
| CN | 103237161 | 8/2013 |

(Continued)

OTHER PUBLICATIONS

Levoy et al., "Recording and controlling the 4D light field in a microscope using microlens arrays", Journal of Microscopy, vol. 235, Pt. 2, 2009, pp. 144-162.

(Continued)

*Primary Examiner* — Sinh Tran
*Assistant Examiner* — Zhenzhen Wu
(74) *Attorney, Agent, or Firm* — Invention Mine LLC

(57) ABSTRACT

A plenoptic camera including a camera lens, a lenslet array having a plurality of microlenses and a photosensors array and having a plurality of photosensors. The camera lens has a spatial light modulator arranged in the aperture stop plane of the camera lens.

22 Claims, 7 Drawing Sheets

(56) References Cited

U.S. PATENT DOCUMENTS

| | | | |
|---|---|---|---|
| 2009/0109518 A1* | 4/2009 | Atkin | G01J 3/02 359/290 |
| 2010/0003024 A1 | 1/2010 | Agrawal et al. | |
| 2010/0045773 A1* | 2/2010 | Ritchey | G02B 13/06 348/36 |
| 2010/0265386 A1* | 10/2010 | Raskar | G02B 27/0075 348/340 |
| 2010/0309467 A1* | 12/2010 | Fox | G01J 3/02 356/326 |
| 2011/0069324 A1 | 3/2011 | Kang et al. | |
| 2011/0128412 A1* | 6/2011 | Milnes | G02B 27/22 348/231.99 |
| 2014/0063332 A1* | 3/2014 | Miyawaki | H04N 5/2254 348/360 |
| 2014/0192255 A1 | 7/2014 | Shroff et al. | |
| 2014/0301176 A1* | 10/2014 | Taguchi | G11B 7/0065 369/103 |
| 2015/0116563 A1* | 4/2015 | Herman | H04N 5/378 348/302 |
| 2017/0180703 A1* | 6/2017 | Kovacovsky | G01S 17/89 |
| 2017/0184980 A1* | 6/2017 | Bogaart | G03F 7/70633 |
| 2017/0366763 A1* | 12/2017 | Lin | G02F 1/13318 |
| 2018/0217235 A1* | 8/2018 | Skowronek | G01S 17/36 |
| 2019/0072897 A1* | 3/2019 | Jepsen | G03H 1/0406 |
| 2019/0281236 A1* | 9/2019 | Kovacovsky | H04N 13/246 |

FOREIGN PATENT DOCUMENTS

| | | |
|---|---|---|
| JP | 2013105151 A | 5/2013 |
| JP | 2013211790 A | 10/2013 |
| JP | 2014132266 A | 7/2014 |
| WO | WO2013058777 | 4/2013 |

OTHER PUBLICATIONS

International Search Report and Written Opinion of the International Searching Authority for PCT/EP2015/071616 dated Nov. 20, 2014, 11 pages.
International Preliminary Report on Patentability for PCT/EP2015/071616 dated Mar. 28, 2017, 7 pages.

* cited by examiner

-- PRIOR ART --

-- PRIOR ART --

-- PRIOR ART --

PLENOPTIC CAMERA COMPRISING A SPATIAL LIGHT MODULATOR

This application claims the benefit, under 35 U.S.C. § 365 of International Application PCT/EP2015/071616, filed Sep. 21, 2015, which was published in accordance with PCT Article 21(2) on Mar. 31, 2016, in English, and which claims the benefit of European Patent Application No. 14306481.4 filed Sep. 25, 2014. The European and PCT applications are expressly incorporated by reference herein in their entirety for all purposes.

1. TECHNICAL DOMAIN

The present disclosure relates to the domain of plenoptic camera and more specifically to the domain of optical assembly for plenoptic camera.

2. BACKGROUND ART

According to the background art, it is known to acquire different views of a same scene with a plenoptic camera, also called light-field camera. FIG. 1 illustrates such a plenoptic camera 1 according to background art. The plenoptic camera 1 is composed of a lens arrangement associated with a photosensor array 13, also called image sensor array 13. The photosensor array 13 comprises a large number m of photosensors 131, 132, 133 to 13m arranged in the form of a grid of C columns and L lines, m corresponding to C time L. A color filter array (CFA) 12 is arranged on the photosensor array 13. The CFA 12 typically arranges RGB (Red, Green and Blue) color filters on the photosensor array, the RGB arrangement taking for the example the form of a Bayer filter mosaic. Typically, one color filter (red, green or blue filter) is associated with one photosensor according to a predetermined pattern, which comprises 50% green, 25% red and 25% blue in the example of a Bayer filter, such a pattern being also called RGBG, GRGB or RGGB pattern. The lens arrangement comprises a primary lens 10 (also called main lens), an iris diaphragm 14 (also called iris) and a lenslet array 11, which comprises a plurality of n microlenses 111, 112, 11n, n being a positive integer greater than or equal to 2. The microlenses 111, 112, 11n are arranged in such a way as to be optically each associated with a plurality of photosensors. The number of photosensors optically associated with one microlens corresponds to the number of views of the scene acquired with the plenoptic camera 1. To obtain the different views, the raw image (i.e. the color sensor data acquired with the photosensor array 13) is demosaiced then de-multiplexed. After the demosaicing step, RGB image data values are obtained at each pixel location for each view. The iris 14 is in charge of controlling the amount of light reaching the photosensor array 13 (in conjunction with the exposure time) as well as the depth of field. The aperture of the iris is usually adjusted by movable blades, for example 8 or 9 blades. Reducing the size of the aperture of the iris 14 means that the amount of light passing through the iris (and thus reaching the photosensors array) is reduced as peripheral light beams are blocked. In case of plenoptic cameras, blocking peripheral light beams means masking outer views, as illustrated on FIG. 2 and FIGS. 3A and 3B. FIG. 2 illustrates light rays 20 coming from two points 200, 201 of a scene acquired with a plenoptic camera, such as the plenoptic camera 1 of FIG. 1, which comprises the main lens 10, the iris 14, the lenslet array 11 and the photosensors array 13. The iris 14 is partially closed, the part blocking rays of light coming from the scene being referenced 141 (black part of the iris) and the aperture letting rays of light passing through the mains lens being referenced 142 (white part of the iris). Light rays 22 coming from the points 200, 201 and blocked by the iris 14 are illustrated with dash lines and light rays not blocked by the iris, i.e. light rays 21 passing through the aperture of the iris and through the main lens are illustrated with solid lines. Only light rays 21 are projected onto the photosensors array 13 through the microlenses of the microlens array 11 and are usable for generating different views of the scene. Views which would correspond to light rays 22 blocked by the closed part of the iris are thus masked. This is particularly visible on FIGS. 3A and 3B. FIGS. 3A and 3B correspond to the projection of photosensors associated with one of the microlens of the microlens array onto the aperture stop plane of the objective of the plenoptic camera materialized by the main lens for sake of simplicity. If the microlens is a circle, the result of the projection is a circle 3 comprising pixels 31, 32, 3, each pixel corresponding to one of the photosensors associated with the microlens. On FIG. 3A, the iris is completely open and every pixel may receive light coming from the scene whereas on FIG. 3B the iris is partially closed (the closed part corresponding to the black part located on the periphery of the circle 3) and pixels located at the periphery of the circle 3, e.g. pixels 31, 32 (and their associated photosensors) do not receive any light, the views corresponding to these pixels being thus masked.

With such an iris 14, the number of views is reduced when the iris is partially closed, which may be the case when controlling the amount of light reaching the photosensors array and/or controlling the depth of field (reducing the amount of light reaching the photosensors array enables for example to increase the depth of field).

3. SUMMARY

The purpose of the present disclosure is to overcome at least one of these disadvantages of the background art.

The present disclosure relates to a plenoptic camera comprising a camera lens, a lenslet array comprising a plurality of microlenses and a photosensors array comprising a plurality of photosensors, the camera lens comprising a spatial light modulator (SLM) arranged in the aperture stop plane of the camera lens.

According to a particular characteristic, the spatial light modulator is a liquid crystal display panel.

Advantageously, a group of photosensors being associated with each microlens, a group of cells of the spatial light modulator is associated with each photosensor of the group of photosensors, the number of groups of cells being equal to the number of photosensors of the group associated with one microlens.

According to a specific characteristic, the group of cells covers the projection of the photosensor associated with the group of cells onto the aperture stop plane.

Advantageously, each cell is configured to switch between a first state and a second state, the first state corresponding to a state where the cell blocks light and the second state corresponding to a state where the cell lets light passing through the cell.

According to another characteristic, at least a part of the cells of the group of cells are in the first state.

Advantageously, the number of cells of the group of cells being in the first state depends on the location of the group of cells in the aperture stop plane.

The present disclosure also relates to a method of controlling the quantity of light reaching a photosensor array of a plenoptic camera, the plenoptic camera comprising a camera lens and a lenslet array, the method comprising controlling a spatial light modulator (SLM) arranged in the aperture stop plane of the camera lens.

Advantageously, the controlling of the spatial light modulator comprises controlling a state of at least a cell of the spatial light modulator, the at least a cell being configured to switch between a first state and a second state, the first state corresponding to a state where the at least a cell blocks light and the second state corresponding to a state where the at least a cell lets light passing through the at least a cell.

According to a specific characteristic, a group of photosensors being associated with each microlens of the lenslet array, a group of cells of the spatial light modulator is associated with each photosensor of the group of photosensors, the number of groups of cells being equal to the number of photosensors of the group associated with one microlens.

The invention also relates to a telecommunication device comprising the plenoptic camera.

The invention also relates to a computer program product comprising instructions of program code for executing the method of controlling the quantity of light reaching a photosensor array of a plenoptic camera, when the program is executed on a computer.

4. LIST OF FIGURES

The present disclosure will be better understood, and other specific features and advantages will emerge upon reading the following description, the description making reference to the annexed drawings wherein.

5. DETAILED DESCRIPTION OF EMBODIMENTS

Figure 1:
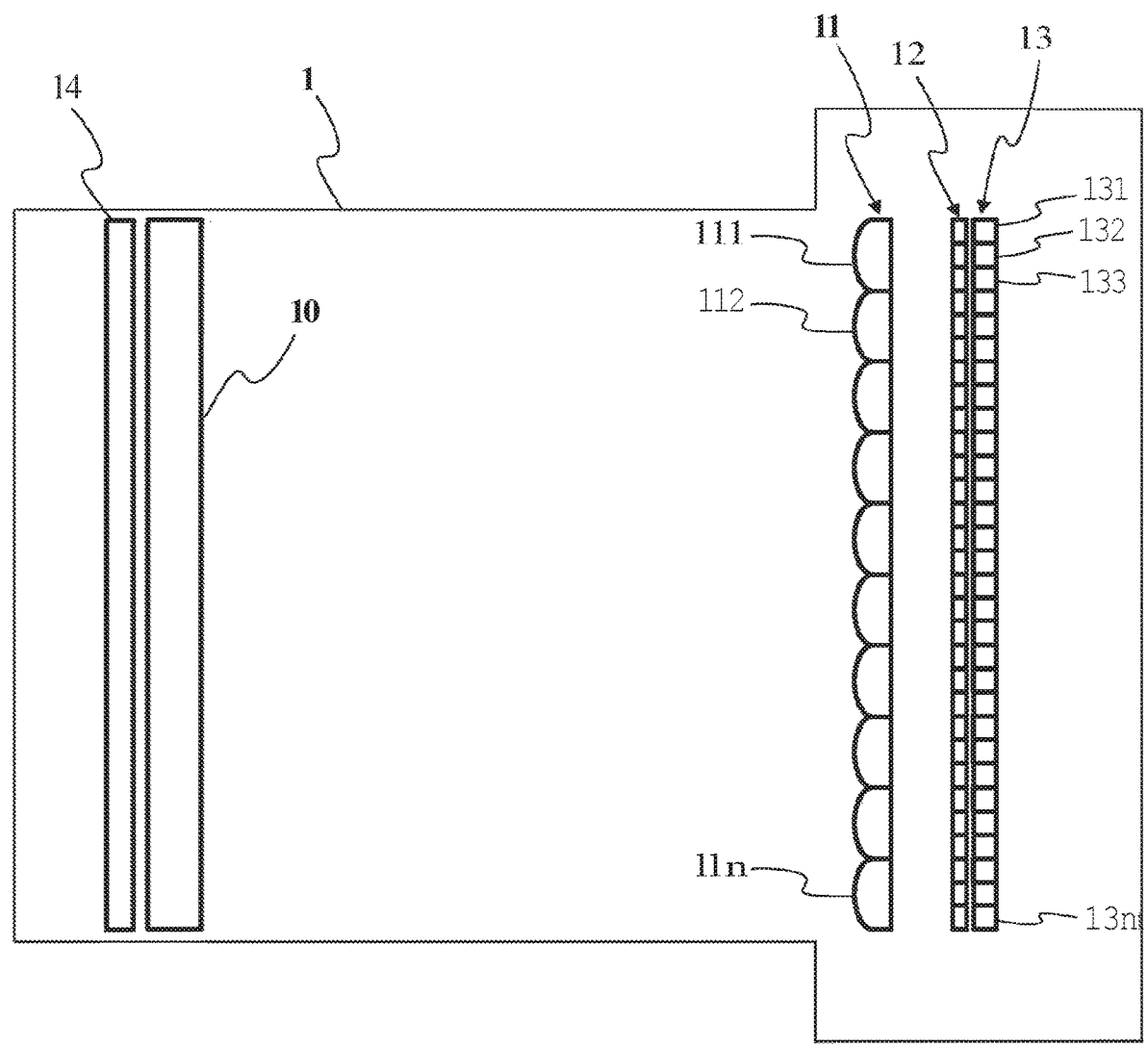
FIG. 1 shows a plenoptic camera, according to the background art.
Figure 2:
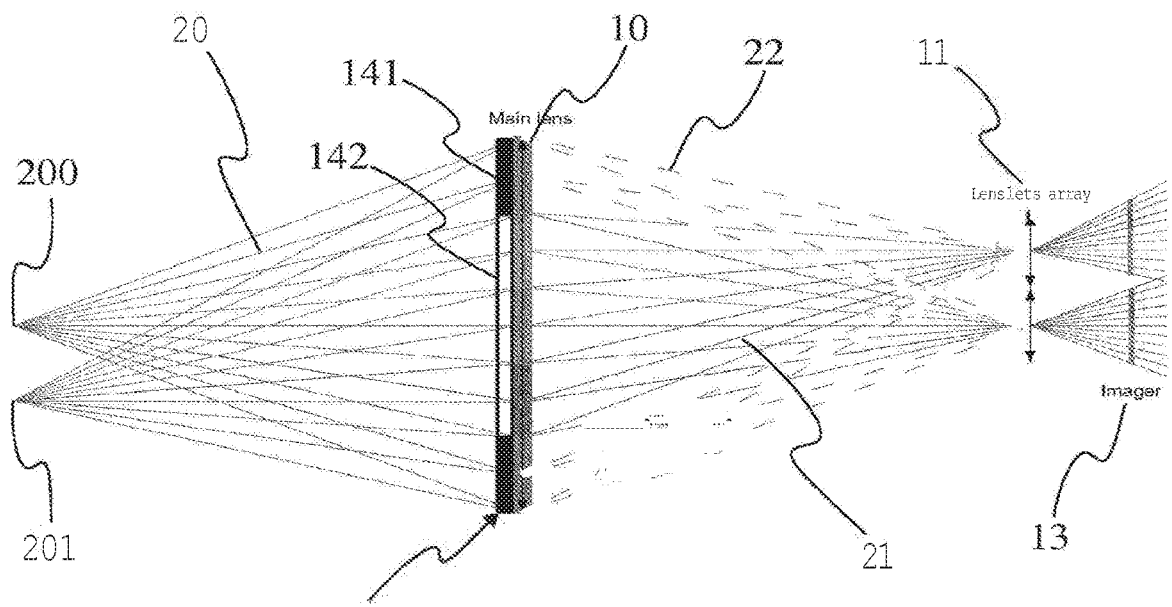
FIG. 2 shows the path of ray of lights into the plenoptic camera of FIG. 1, according to the background art.
Figure 3A:
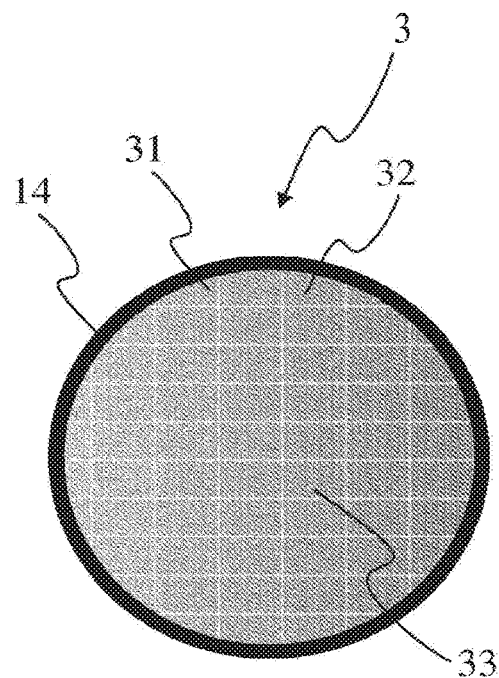
FIGS. 3A and 3B show the iris of the plenoptic camera of FIG. 1 in two different states, i.e. open and partially closed, according to the background art.
Figure 3B:
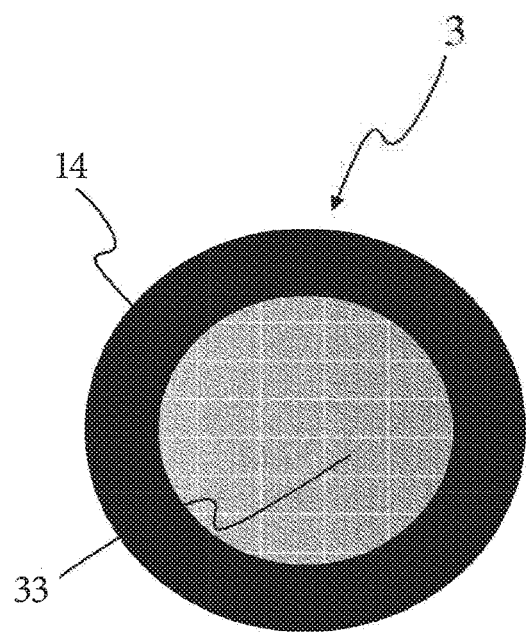

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

According to a particular embodiment of the present principles, the optical assembly of a plenoptic camera comprises a spatial light modulator (SLM) arranged in the aperture stop plane of the camera lens (also called main lens or primary lens) of the optical assembly. For sake of simplicity, drawings illustrate only one lens to illustrate the main lens. It is naturally understood that the main lens may correspond to a set of several lenses.

It is understood with aperture stop plane of the camera lens the plane of the physical device(s) (lens(es) and/or a diaphragm) that limit the cone of light passing through the camera lens. The plane of the aperture stop is a determined plane (depending from the design of the camera lens) where a diaphragm or more generally speaking an aperture stop would be positioned to limit the cone of light passing through the camera lens.

It is understood that a Spatial Light Modulator (SLM) comprises a device that imposes some form of spatially varying modulation on a beam of light, typically spatially modulating the intensity of the light beam passing through the SLM. The SLM may be for example any transmissive display panel, e.g. a transmissive LCoS (Liquid Crystal on Silicon) display or a LCD (Liquid-Crystal Display) panel.

The use of a SLM instead of a state-of-the-art diaphragm enables limiting the quantity of light reaching the photosensors array without deleting any views, and more specifically peripheral views, acquired with the plenoptic camera.

Figure 4:
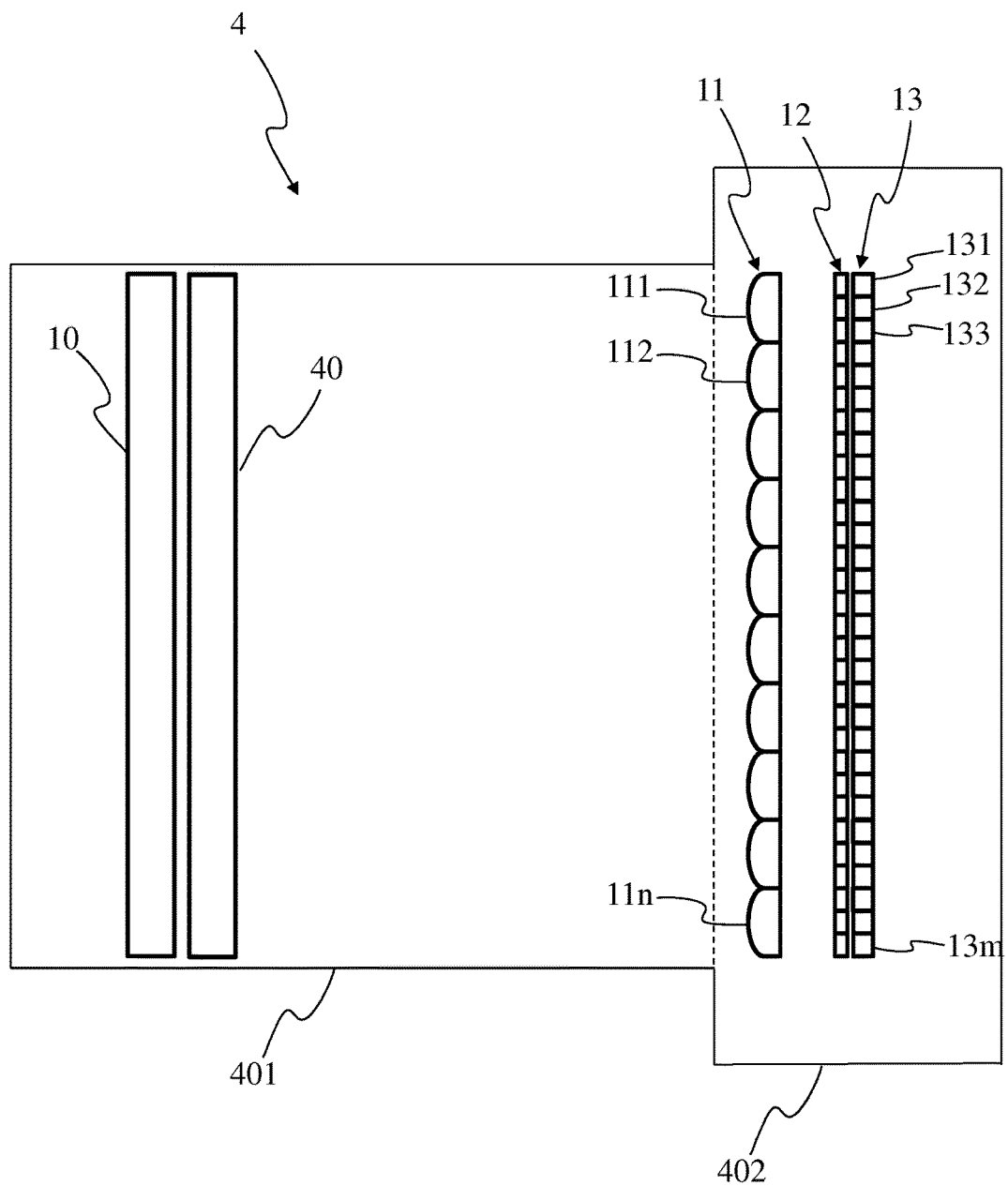
FIG. 4 shows a plenoptic camera, according to a particular embodiment of the present principles.

FIG. 4 shows a plenoptic camera 4 according to a particular embodiment of the present principles. The plenoptic camera comprises a camera lens 401 (corresponding to an optical assembly) and a camera body 402.

The camera lens 401 advantageously forms a lens unit adapted to be associated with a camera body 402. The camera body comprises a photosensor array 13, which comprises a plurality m of photosensors 131, 132, 133 to 13m. Each photosensor corresponds to a pixel of the raw image of the scene acquired with the photosensor array, each pixel covering a part (also called a point) of the scene. For purposes of illustration, the photosensor array 13 is shown with a relative small number of photosensors 131 to 13m. Naturally, the number of photosensors is not limited to the illustration of FIG. 4 but extends to any number of photosensors, for example several thousand or several millions of photosensors, for example 12.4 megapixels, a pixel corresponding to a photosensor (e.g. corresponding to an array of 4088×3040 pixels/photosensors). A color filter array (CFA) 12 is arranged on the photosensor array 13. The CFA 12 typically arranges RGB (Red, Green and Blue) color filters on the photosensor array, the RGB arrangement taking for the example the form of a Bayer filter mosaic. For associating the camera lens 401 with the camera body 402, the camera lens 401 comprises a first attaching part and the camera body comprises a second attaching part, the first and second attaching parts being compatible. Thanks to the first and second attaching parts, the camera lens 401 may be clipped into the camera body 402 or the camera lens 401 may be screwed with the camera body 402. An example of such first and second attaching parts of a lens unit configured to be associated with a camera body may be found in the Japanese patent application JP2013-105151A, which was published on May 30, 2013. The first and second attaching parts are configured in such a way that, once the plenoptic optical assembly 401 and the camera body 402 have been put together, the camera lens 401 and the camera body 402 form a plenoptic camera configured for acquiring multiple views of a scene at each acquisition of the scene. To that aim, the camera body also comprises a lenslet array 11 comprising n microlenses 111, 112, 11n, n being an integer greater than or equal to 2. For purposes of illustration, the lenslet array 11 is shown with a relative small number of microlenses, but the number of microlenses may extend up to several thousand or even one or several million of microlenses. A group of photosensors of the photosensor array 13 are optically associated with each microlens 111 to 11n of the lenslet array 11. For example, each microlens 111 to 11n of the lenslet array 11 is sized to correspond to an array of 2×1, 4×4 or 10×10 photosensors. Each photosensor of the plurality of photosensors optically associated with one single microlens enables to acquire raw data representative of a pixel of the scene according to one view angle. According to a variant, the camera lens 401 and the camera body 402 form one single body and are assembled without being detachable.

The camera lens 401, also called mains lens or primary lens 10, is advantageously formed of one or more lens elements, only one lens element 10 being represented on FIG. 4 for clarity purpose. The camera lens 401 also comprises a SLM 40 arranged in the aperture stop plane of the primary lens 10. The SLM advantageously corresponds to an array of cells, each cell being configured to either let the light passing through it (partially or completely) or to block the light. Each cell is controllable to be either in a first state corresponding to the state where the cell blocks the light reaching it or in a second state corresponding to the state where the cell lets the light passing through it, at least partially. If the SLM corresponds to a LCD panel, each cell corresponds to a pixel comprising a layer of liquid-crystal molecules aligned between electrodes and two polarizing filters, the orientation of the liquid-crystal molecules being controlled by applying an electric field between the electrodes. By controlling the amplitude of the voltage applied across the liquid crystal layer, light may be allowed to pass through in varying amounts or not allowed to pass through at all.

The plenoptic camera 4 advantageously comprises a hardware control module (not illustrated on FIG. 4) configured for controlling the state of the cells of the SLM 40 of FIG. 4. The control module may be comprised in the camera body 402 or in the camera lens 401. The control module advantageously comprises one or several processors associated with a memory, for example Random Access Memory or RAM comprising registers. The memory stores instructions of an algorithm implementing the method of controlling the amount of light reaching the photosensors array described hereinafter with regard to FIG. 8. According to a variant, the control module takes the form of a programmable logical circuit of type FPGA (Field-Programmable Gate Array) for example, ASIC (Application-Specific Integrated Circuit) or a DSP (Digital Signal Processor). The control module may also comprise an interface configured to receive and transmit data such as control parameters input by a user via a user interface to set parameters impacting the control of the cells of the SLM to control the amount of light reaching the photosensors array (for example desired depth of field, desired exposure of the pictures acquired with the plenoptic camera).

Figure 5:
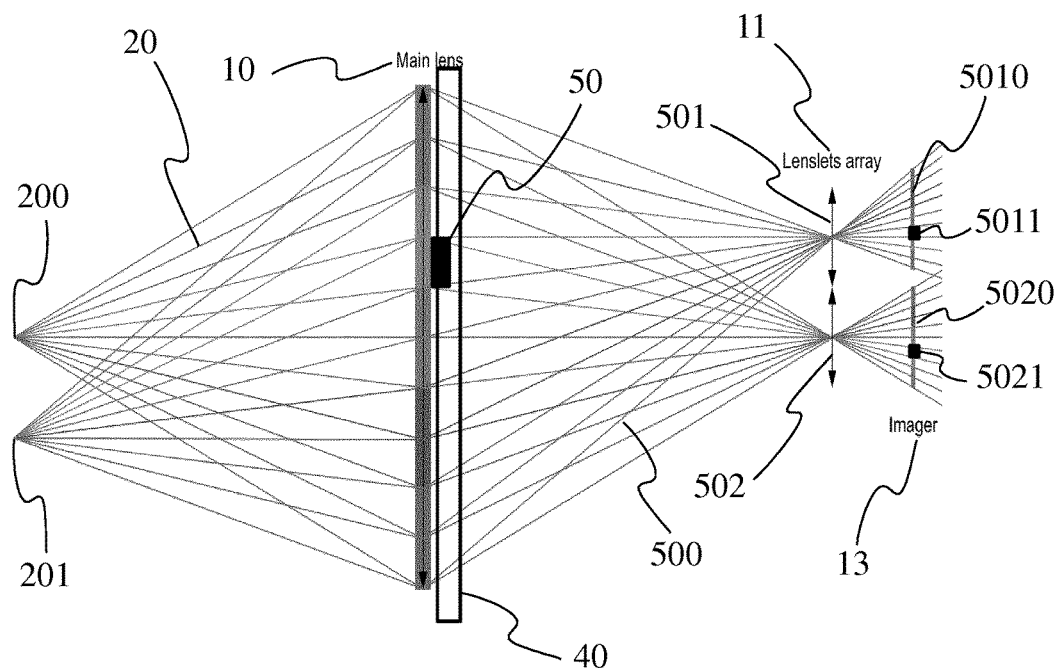
FIG. 5 shows the path of ray of lights into the plenoptic camera of FIG. 4, according to a particular embodiment of the present principles.

FIG. 5 shows light rays bundles passing through the camera lens of the plenoptic camera 4 to reach the photosensors array 13, according to a particular embodiment of the present principles. As illustrated on FIG. 4, a group of photosensors of the photosensors array is optically associated with each microlens of the lenslet array 11. For example, the group of photosensors 5010 is associated with the microlens 501 and the group of photosensors 5020 is associated with the microlens 502. The number of views of a same point 200, 201 of the scene acquired with the plenoptic camera corresponds to the number of photosensors optically associated with one microlens as, thanks to the geometry of the microlens, a same point of the scene is viewed according to different angles. This means that each photosensor optically associated with a given microlens acquires data representative of a specific view of a point of the scene. The number of views of the scene acquired with the plenoptic camera corresponds to the number of pixels associated with each (i.e. under each) microlens of the lenslet array 11. The number of photosensors optically associated with one microlens is advantageously the same for each microlens of the lenslet array 11. As illustrated on FIG. 5, the ray of lights 20 coming from the acquired scene (represented with two points 200 and 201 on FIG. 5) pass through the primary lens 10, the SLM 40 and the lenslet array 11 before reaching the photosensors array 13. Light rays 20 are called input light rays before they pass through the SLM 40 and are called output light rays 500 once they have passed through the SLM 40. The intensity of the output light rays 500 reaching the photosensors array may be reduced in comparison to the intensity of the input light ray, depending on the state of the cells of the SLM through which they pass. The amount of light reaching a given photosensor of a group of photosensors 5010, 5020 may be reduced depending on the state of the cells of the SLM optically associated with the given photosensor, as explained with more details with regard to FIGS. 6 and 7.

Naturally, the number of photosensors of the groups of photosensors 5010, 5020 respectively associated with the microlenses 501 and 502 is not limited to the n photosensors illustrated on FIG. 5 each corresponding to a different view of the points 200 and 201 respectively but advantageously extends to a number greater than n. The photosensors belonging to the groups of photosensors 5010, 5020 and not illustrated on FIG. 5 advantageously receive light information received from points of the scene different from the points 200 and 201.

Figure 6:
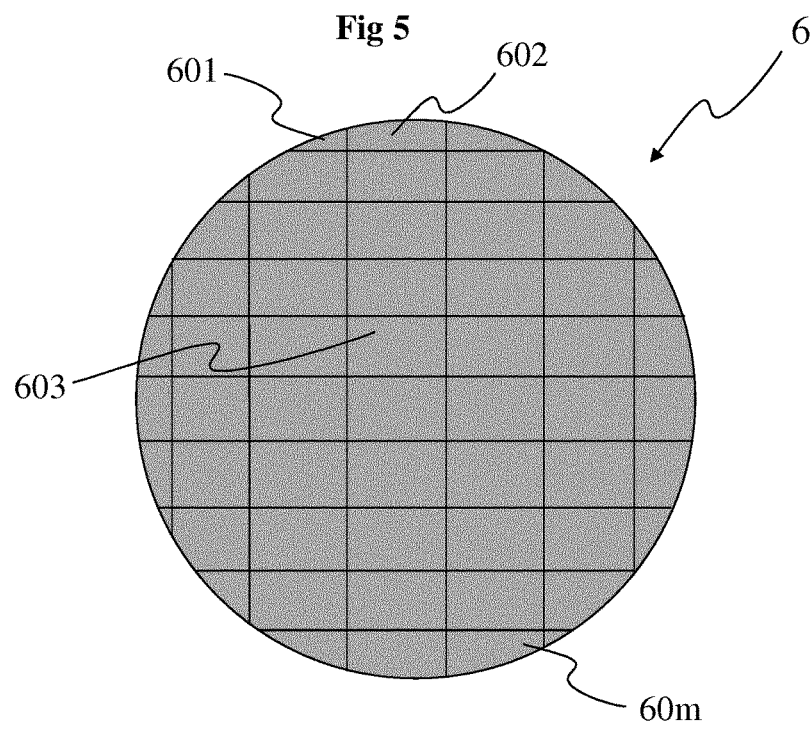
FIG. 6 shows the projection of photosensors of the plenoptic camera of FIG. 4 onto the aperture stop plane of the plenoptic camera of FIG. 4, according to a particular embodiment of the present principles.
Figure 7:
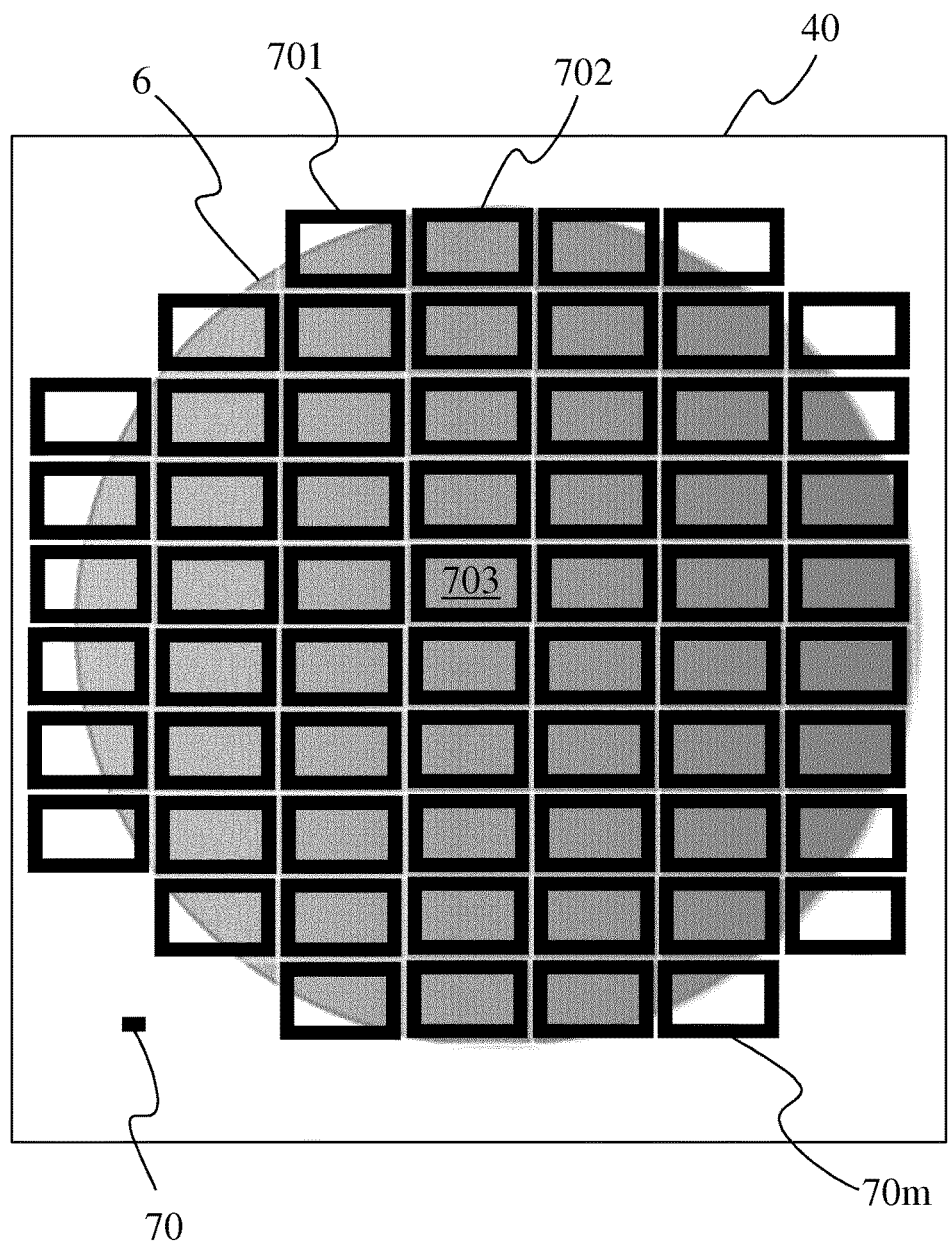
FIG. 7 shows a spatial light modulator of the plenoptic camera of FIG. 4, according to a particular embodiment of the present principles.

As explained with more details with regard to FIGS. 6 and 7, the SLM 40 comprises a plurality of cells, each switchable from a first state and a second state to block the light arriving to it or to let the light passing through it, totally or partially. The element referenced 50 corresponds to a group of adjacent cells of the SLM 40 associated with one specific photosensor under each microlens. According to the example of FIG. 5, the group of cells 50 is optically associated with the photosensor 5021 of the group of photosensors 5020, which is associated with (or under) the microlens 502 and is optically associated with the photosensor 5011 of the group of photosensors 5010, which is associated with (or under) the microlens 501. Considering that each group of photosensors associated with a microlens is an array of lines and columns of photosensors with same number of lines and same number of columns for each microlens, the position (column number and line number) of the photosensor (in the group of photosensors to which it belongs) optically associated with a given group of cells of the SLM is the same for each and every photosensor optically associated with the given group of cells. For example, the position of the photosensor 5021 (optically associated with the group of cells 50) in the group of photosensors 5020 (under the microlens 502) is the same as the position of the photosensor 5011 (optically associated with the group of cells 50) in the group of photosensors 5010 (under the microlens 501).

FIG. 6 illustrates the projection of a group of photosensors associated with a given microlens onto the aperture stop plane of the primary lens of the plenoptic camera 4, according to a particular embodiment of the present principles. In other words, FIG. 6 represents the image 6 of each group of photosensors associated with one microlens of the lenslet array on the aperture stop plane of the primary lens 10. The image 6 takes the general form of the microlenses, i.e. if the microlenses are circular, the image 6 is a circle; if the microlenses are square or rectangle, then the image 6 is a square or a rectangle. The image 6 comprises a plurality of elements 601, 602, 603 to 60*m*, which may be called pixels. The number m of pixels corresponds to the number of photosensors comprised in a group of photosensors 5010, 5020 associated with one microlens. Each pixel 601 to 60*m* corresponds to one photosensor of the group of photosensor and one pixel of the image 6 refers to one unique photosensor in each group of photosensor, the photosensors referring to a pixel in the image 6 having identical coordinates (e.g. line number and column number) in the group of photosensors to which they belong. For example, pixel 603 is associated with (or corresponds to) the photosensor 5011 of the group of photosensors 5010 and is also associated with the photosensor 5021 of the group of photosensors 5020, the coordinates of the photosensor 5011 with regard to the group 5010 to which it belongs being identical to the coordinates of the photosensor 5021 with regard to the group 5020 to which it belongs.

FIG. 7 shows the spatial light modulator 40 located in the aperture stop plane of the primary lens of the plenoptic camera, according to a particular embodiment of the present principles. The spatial light modulator 40 comprises a plurality of cells 70 and corresponds for example to an array of columns and lines of cells. Part of the cells of the SLM 40 are grouped to form m group of cells 701, 702, 703, 70*m*, the number m of group of cells being equal to the number m of pixels of the image 6, i.e. being equal to the number m of photosensors forming each group of photosensors 5010, 5020 under each microlens 501, 502. A determined group of cells is associated with one determined photosensor of each group of photosensor. For example, the group of cells referenced 703 is associated with the pixel 603 of the image 6, i.e. the group of cells 703 covers the projection of the photosensor 5011 belonging to the group of pixels 5010 and also the projection of the photosensor 5021 belonging to the group of pixels 5020 as both photosensors 5011 and 5021 projects onto the same pixel of the image 6. Said differently, the group of cells 703 is associated with one photosensor of each group of photosensors under each microlens. The cells of the SLM 40 are grouped in order to cover each pixel of the image 6, i.e. the boundaries of a group of cells correspond to the boundaries of the pixel of the image 6 with each this group of cells is associated in order that the area covered by the group of cells corresponds to the area covered by the associated pixel of the image 6. Each cell 701 to 70*m* of the SLM 40 is able to switch between two different state, i.e. either a first state wherein the cell blocks the light arriving to it from the scene or in a second state wherein the cell lets the light arriving to it passing through it, partially or totally. By controlling the state of the cells of a group of cells associated with a determined photosensor of the photosensors array, it is then possible to control the amount of light reaching this determined sensor. Such a control may be performed for each group of cells of the SLM 40 and thus for each photosensor of the photosensors array, which enables to acquire all the views of the scene, in contrast to what is done when the amount of light reaching the photosensors array is controlled with a diaphragm iris of the state of the art.

Figure 8:
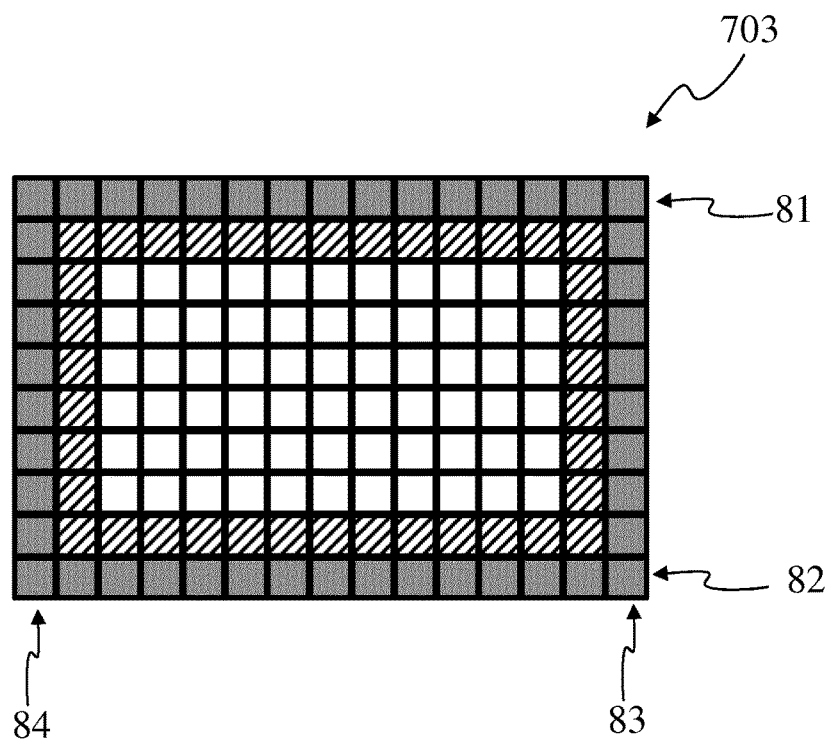
FIG. 8 shows a group of cells of the spatial light modulator of FIG. 7, according to a particular embodiment of the present principles.

FIG. 8 illustrates with more details a group of cells of the spatial light modulator 40, for example the group of cells 703, according to a particular embodiment of the present principles. The group of cells 703 corresponds to an array of cells with for example L lines and C columns, L and C being integer greater than or equal to 2, according to a non-limitative example. To limit the quantity of light (corresponding for example to an energy flow per unit of time, expressed for example in W/s) reaching the photosensor(s) associated with the group of cells 703, one or several cells of the group of cells 703 are set to the first state, these cells blocking the light arriving to them, the rays of light blocked by these cells then not reaching the photosensor(s) associated with the group of cells 703. The more cells of the group of cells 703 are in the first state, the more the amount of light reaching the photosensor(s) associating with it 703 is reduced with regard to the maximum amount of light that may reach the photosensor(s) associated with the group of cells 703 (i.e. when all cells of the group of cells 703 are in a second state letting totally the light passing through them). Advantageously, the first cells of the group of cells that are set to the first state to limit the amount of light reaching the photosensor(s) associated with this group of cells 703 are the cells belonging to the lines 81, 82 and columns 83, 84 of cells forming the boundaries of the group of cells 703, i.e. the cells belonging to the periphery of the group of cells. To control and limit the amount of light reaching a photosensor, one, two or more rows of the periphery of the group of cells associated with this photosensor are set to the first state, by starting with the lines and columns 81 to 84 located at the outer periphery of the group of cells (corresponding to the cells filled with grey shading on FIG. 8) and progressing toward the centre of the group of cells. For example, the first lines and first columns of cells to be set to the first state are the lines 81, 82 and columns 83, 84 forming the outer periphery of the group of cells, the second lines and columns of cells to be set to the first state being the lines an columns adjacent to the first lines 81, 82 and first columns 83, 83 by progressing toward the centre of the group of cells (corresponding to the cells filled with a pattern of diagonal lines on FIG. 8) and so on. The other cells (filled with white on FIG. 8) are advantageously set to the second state and let the rays of light arriving to them totally passing through them to reach the photosensors associated with the group of cells 703.

According to a variant, for example to further limit the amount of light reaching the photosensor, one or several rows of cells of the periphery of the group of cells associated with this photosensor may be set to the first state as explained just before and some of the remaining cells of the group of cells (identified with white filling on FIG. 8) that are set to the second state may be controlled to let the light passing through them only partially, i.e. by letting only a percentage of the light arriving to them from the scene (for example 80%, 70%, 50%, 30% or even 10%). For example, the percentage of light passing through the cells may increase when starting from the cells adjacent to the cells in the first state by progressing toward the centre of the group of cells 703, the increasing of the percentage being linear or not.

According to another variant, the cells to be first set to the first state corresponds to the cells belonging to the first line of the group of cells 703 (i.e. the upper line 81 of the array of cells), the cells to be secondly set to the first state (if light reaching the photosensor is to be further reduced) corresponds to the cells belonging to the second line of the group of cells 703, i.e. the line adjacent to the first line 81 when progressing from the upper part to the lower part of the group of cells, and so on.

According to a further variant, the cells to be first set to the first state corresponds to the cells belonging to the lowest line of the group of cells 703 (i.e. the line 82), the cells to be secondly set to the first state (if light reaching the photosensor is to be further reduced) corresponds to the cells belonging to the second line of the group of cells 703, i.e. the line adjacent to the lowest line 82 when traversing the group of cells from the lower part to the upper part, and so on.

According to another variant, only a part of the cells of a line are first set to the first state, the rest of the cells of the line being only set to the first state is the quantity of light reaching the photosensor(s) associated with the group of cells 703 is to be further reduced.

According to a further variant, the first cells to be set to the first state belongs to the first column on the left (respectively on the right) of the group of cells (i.e. column 84 (respectively 83) on FIG. 8), the cells of the second column adjacent to this first column 84 (respectively 83) when traversing the group of cells from the left to the right (respectively from the right to the left) being then set to the first state if the quantity of light reaching the photosensor(s) associated with the group of cells 703 is to be further reduced, and so on.

According to a variant, every cell of the group of cells is in the second state, the control of the cells to limit the quantity of light reaching the photosensor(s) associated with the group of cells 703 being performed by controlling the percentage of the quantity of light that each cell lets passing through it.

The cells in the first state are shown shaded and the cells in the second state are shown in white on FIG. 7. In an advantageous way, the number of cells in the first state may vary from a group of cells to another one. For example, the number of cells in the first state may be more important for the group of cells located at the level of the centre of the image 6 than at the periphery of the image 6. Such an implementation enables that the quantity of light passing through each group of cells may be the same or about the same (i.e. with for example a variation less than 3%, 5% or 10% around the average quantity of light outputting from the groups of cells of the SLM 40). Indeed, the quantity of light arriving to a group of cells located at the periphery of the image 6 is less than the quantity of light arriving to a group of cells located near the centre of the image 6, i.e. near the optical centre of the aperture stop plane. By setting more cells to the first state for group of cells near the centre of the image 6 than for groups of cells located at the periphery, one obtains that the quantity of light outputting from the groups of cells is the same or about the same for each group of cell of the SLM 40.

According to a variant, the number of cells set to the first state is the same for each and every group of cells of the SLM 40.

Figure 9:
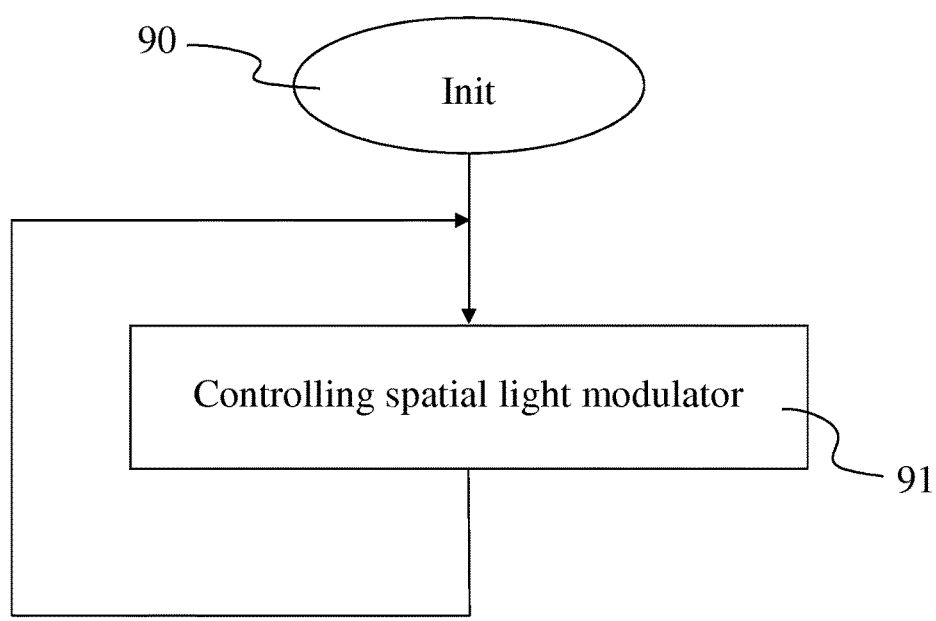
FIG. 9 shows a method of controlling the quantity of light reaching the photosensors array of the plenoptic camera of FIG. 4, according to a particular embodiment of the present principles.

FIG. 9 shows a method of controlling the quantity of light reaching the photosensors array of the plenoptic camera 4, according to a particular embodiment of the present principles.

During an initialisation step 90, the different parameters of the plenoptic camera, notably the parameters used to control the SLM 40, are updated. In particular, the state of the cells of the SLM 40 are initialised in any way, for example set to the second state for letting light totally passing through each cell. According to a variant, the cells are initialized to be in the first state.

Then during a step 91, the state of the cells of the SLM 40 are controlled to be in the first state or in the second state to control the amount of light passing through them and thus controlling the amount of light reaching the photosensors of the photosensors array of the plenoptic camera. The state of the cells are for example controlled automatically, for example according to the lighting conditions of the scene acquired with the plenoptic camera and according to default parameters representative of the exposure and/or luminance of the pictures representative of the scene acquired with the plenoptic camera. According to a variant, the state of the cells is controlled according to parameters input by the user using the plenoptic camera, the parameters input by the user enabling for example to set a desired depth of field or a desired brightness and/or luminance of the pictures acquired with the plenoptic camera.

The cells of the SLM 40 may be for example all set to the first state, the SLM playing the role of a shutter by getting full opaque during a determined period of time, the SLM controlling both exposure and depth of field.

The cells of the SLM 40 may be for example all set to the second state for fully letting the light incoming from the scene passing through the SLM. While being all in the second state, the percentage of light passing through the cells may be different from a cell to another one to control the amount of light reaching each photosensor.

According to another variant, some of the cells of some or all of the groups of cells may be in the first state while the remaining cells of the groups of cells are in the second state.

Figure 10:
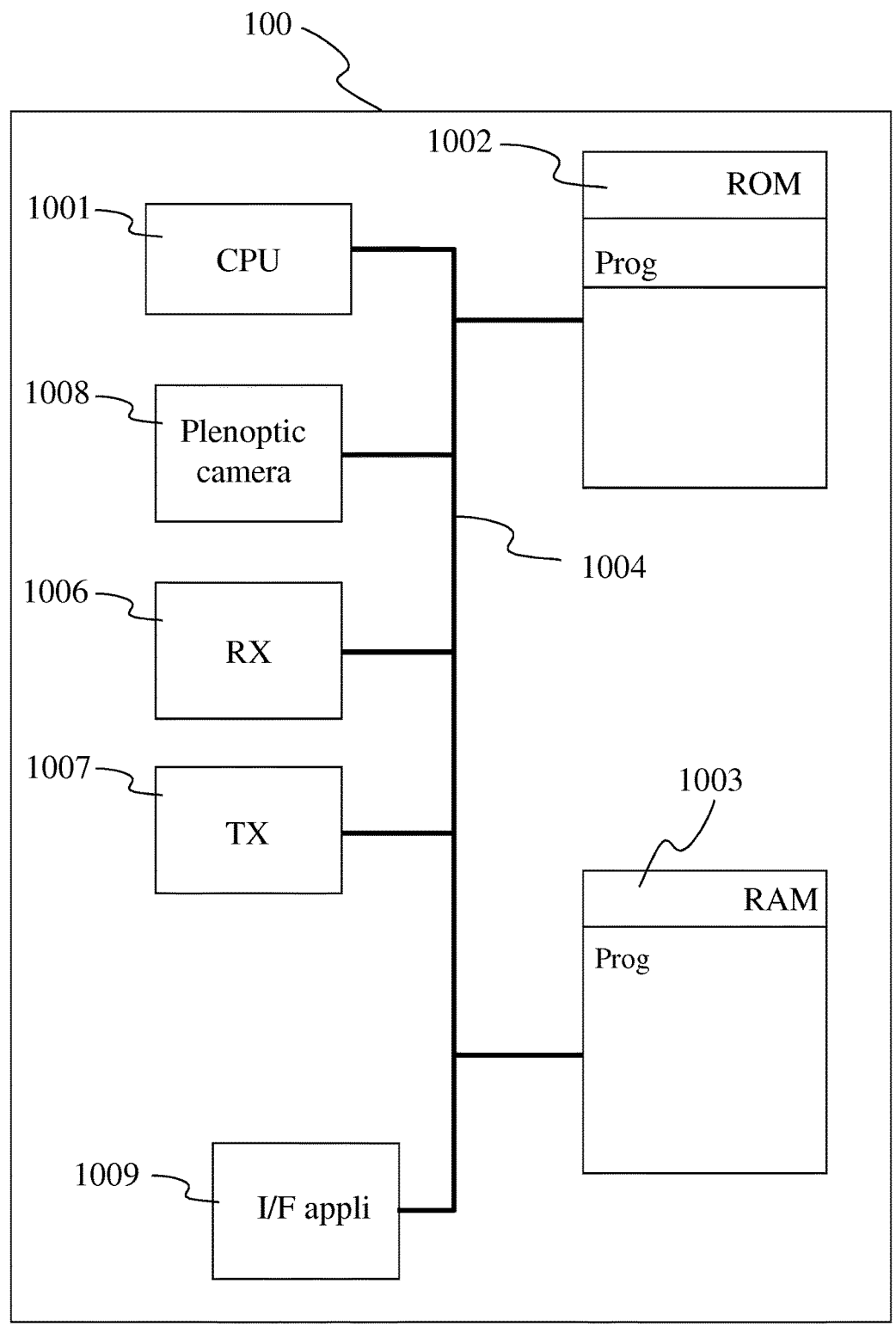
FIG. 10 shows a telecommunication device comprising the plenoptic camera of FIG. 4, according to a particular embodiment of the present principles.

FIG. 10 diagrammatically illustrates a hardware embodiment of a telecommunication device 100, corresponding for example to a smartphone or a tablet.

The telecommunication device 100 comprises the following elements, connected to each other by a bus 34 of addresses and data, that also transports a clock signal:
- a microprocessor 1001 (or CPU),
- a non-volatile memory of ROM (Read Only Memory) type 1002,
- a Random Access Memory or RAM 1003,
- a radio interface 1006,
- an interface 1007 adapted for the transmission of data,
- a plenoptic camera 1008, corresponding for example to the plenoptic camera 4 of FIG. 4,
- an MMI interface 1009 adapted for displaying information for a user and/or inputting data or parameters.

It is noted that the word "register" used in the description of memories 1002 and 1003 designates in each of the memories mentioned, a memory zone of low capacity as well as a memory zone of large capacity (enabling a whole programme to be stored or all or part of the data representing data received and decoded).

The memory ROM 1002 comprises in particular a "prog" program.

The algorithms implementing the steps of the method specific to the present disclosure and described below are stored in the ROM 1002 memory associated with the telecommunication device 100 implementing these steps. When powered up, the microprocessor 1001 loads and runs the instructions of these algorithms.

The random access memory 1003 notably comprises:

in a register, the operating programme of the microprocessor 1001 responsible for switching on the telecommunication device 100, reception parameters (for example parameters for modulation, encoding, MIMO, recurrence of frames), transmission parameters (for example parameters for modulation, encoding, MIMO, recurrence of frames), incoming data corresponding to the data received and decoded by the receiver 1006, decoded data formed to be transmitted at the interface to the application 1009, parameters for controlling the state of the SLM 40.

Other structures of the telecommunication device 100 than those described with respect to FIG. 10 are compatible with the present disclosure. In particular, according to variants, the telecommunication device may be implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components embedded in an apparatus or even in a form of a mix of hardware elements and software elements.

The radio interface 1006 and the interface 1007 are adapted for the reception and transmission of signals according to one or several telecommunication standards such as IEEE 802.11 (Wi-Fi), standards compliant with the IMT-2000 specifications (also called 3G), with 3GPP LTE (also called 4G), IEEE 802.15.1 (also called Bluetooth) . . . .

According to a variant, the telecommunication device does not include any ROM but only RAM, the algorithms implementing the steps of the method specific to the present disclosure being stored in the RAM.

Naturally, the present disclosure is not limited to the embodiments previously described.

In particular, the present disclosure is not limited to a plenoptic optical assembly but also extends to any device integrating such a plenoptic optical assembly, for example a plenoptic camera comprising a photosensors array or a telecommunication device comprising a photosensors array.

Telecommunication devices includes, for example, smartphones, smartwatches, tablets, computers, mobile phones, portable/personal digital assistants ("PDAs"), and other devices that facilitate communication of information between end-users but also set-top-boxes.

The method and control operations of the cells of the SLM 40 described herein may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A plenoptic camera comprising:
   a camera lens;
   a lenslet array comprising a plurality of microlenses;
   a photosensor array comprising a plurality of groups of photosensors, each group of photosensors associated with a respective microlens of the plurality of microlenses, wherein the photosensor array is configured to obtain a raw image representative of a plurality of views of a scene;
   a spatial light modulator arranged in the aperture stop plane of the camera lens and comprising a plurality of cells configured in an array of groups of adjacent cells, wherein each group of adjacent cells is associated with a respective photosensor of each group of photosensors;
   a controller configured to control a state of the cells of each group of adjacent cells to control an amount of light received by each respective photosensor of the group of photosensors.

2. The plenoptic camera according to claim 1, wherein the spatial light modulator is a liquid crystal display panel.

3. The plenoptic camera according to claim 1, wherein the amount of light is the same for each group of adjacent cells.

4. The plenoptic camera according to claim 1, wherein each group of adjacent cells covers a projection of the respective photosensor associated with each group of photosensors onto the aperture stop plane.

5. The plenoptic camera according to claim 1, wherein each cell is configured to switch between a first state and a second state, wherein each cell blocks light in the first state and wherein light passes at least partially through each cell in the second state.

6. The plenoptic camera according to claim 5, wherein at least a part of the plurality of cells is in the first state.

7. The plenoptic camera according to claim 5, wherein a number of cells of a group of adjacent cells in the first state depends on a location of the group of adjacent cells in the spatial light modulator.

8. The plenoptic camera according to claim 5, wherein a number of cells in the first state of a group of adjacent cells close to a center of the spatial light modulator is greater than a number of cells in the first state of a group of adjacent cells at a periphery of the spatial light modulator.

9. The plenoptic camera of claim 1, wherein a number of groups of the plurality of cells is equal to a number of photosensors in each group of photosensors.

10. The plenoptic camera of claim 1, wherein the lenslet array is disposed between the photosensor array and the spatial light modulator.

11. A method of controlling a quantity of light reaching a photosensor array of a plenoptic camera, wherein the photosensor array is configured to obtain a raw image representative of a plurality of views of a scene, wherein the plenoptic camera comprises:
   a camera lens;
   a lenslet array comprising a plurality of microlenses;
   the photosensor array comprising a plurality of groups of photosensors, each group of photosensors associated with a respective microlens of the plurality of microlenses;
   a spatial light modulator arranged in the aperture stop plane of the camera lens and comprising a plurality of cells in an array of groups of adjacent cells, wherein each group of adjacent cells is associated with a respective photosensor of each group of photosensors;
wherein the method comprises:
controlling a state of the cells of each group of adjacent cells to control an amount of light received by each respective photosensor of the group of photosensors.

12. The method according to claim 11, wherein controlling the state of the cells comprises controlling a state of the cells of the spatial light modulator, wherein each of the plurality of cells is configured to switch between a first state and a second state, wherein each cell blocks light in the first state and wherein light passes at least partially through each cell in the second state.

13. The method according to claim 12, wherein at least a part of the plurality of cells is in the first state.

14. The method according to claim 12, wherein a number of cells of a group of adjacent cells in the first state depends on a location of the group of adjacent cells in the spatial light modulator.

15. The method according to claim 12, wherein a number of cells in the first state of a group of adjacent cells close to a center of the spatial light modulator is greater than a number of cells in the first state of a group of adjacent cells at a periphery of the spatial light modulator.

16. The method according to claim 11, wherein each group of adjacent cells covers projection of the respective photosensor associated with each group of photosensors onto the aperture stop plane.

17. The method according to claim 11, wherein the spatial light modulator is a liquid crystal display panel.

18. The method according to claim 11, wherein the amount of light is the same for each group of adjacent cells.

19. A telecommunication device comprising:
   a plenoptic camera comprising:
   a camera lens;
   a lenslet array comprising a plurality of microlenses;
   a photosensor array comprising a plurality of groups of photosensors, each group of photosensors associated with a respective microlens of the plurality of microlenses, wherein the photosensor array is configured to obtain a raw image representative of a plurality of views of a scene;
   a spatial light modulator arranged in the aperture stop plane of the camera lens and comprising a plurality of cells configured in an array of groups of adjacent cells, wherein each group of adjacent cells is associated with a respective photosensor of each group of photosensors;
   a controller configured to control a state of the cells of each group of adjacent cells to control an amount of the light received by each respective photosensor of the group of photosensors.

20. The telecommunication device of claim 19, wherein each cell is configured to switch between a first state and a second state, wherein each cell blocks light in the first state and wherein light passes at least partially through each cell in the second state, wherein a number of cells of a group of adjacent cells in the first state depends on a location of the group of adjacent cells in the spatial light modulator.

21. A non-transitory processor-readable medium having stored therein instructions for causing a processor to perform a method of controlling a quantity of light reaching a photosensor array of a plenoptic camera comprising a camera lens, a lenslet array comprising a plurality of microlenses, the photosensor array comprising a plurality of groups of photosensors, each group of photosensors associated with a respective microlens of the plurality of microlenses, a spatial light modulator arranged in the aperture stop plane of the camera lens and comprising a plurality of cells arranged in an array of groups of adjacent cells, wherein each group of adjacent cells is associated with a respective photosensor of each group of photosensors, wherein the controlling comprises controlling a state of the cells of each group of adjacent cells to control an amount of light received by each respective photosensor of the group of photosensors, wherein the photosensor array is configured to obtain a raw image representative of a plurality of views of a scene.

22. The non-transitory processor-readable medium of claim 21, wherein the controlling comprises controlling a state of the cells of the spatial light modulator, wherein each of the plurality of cells is configured to switch between a first state and a second state, wherein each cell blocks light in the first state and wherein light passes at least partially through each cell in the second state.

* * * * *